UNITED STATES PATENT OFFICE 2,504,951

PREPARATION OF ACYLOXYMETHYL OXAZOLINES

Philip F. Tryon, Terre Haute, Ind., assignor to Commercial Solvents Corporation, Terre Haute, Ind., a corporation of Maryland No Drawing. Application September 11, 1944, Serial No. 553,671

6 Claims. (Cl. 260—307)

This invention relates to a method for preparing esters of hydroxymethyl 2-oxazolines in high yields, and more particularly to a method for preparing compounds having the following structure:

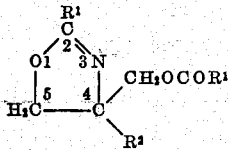

in which the $R^1$ substituents are the same and may be alkyl or aryl, and $R^2$ may be hydrogen, alkyl or acyloxymethyl.

Esters of hydroxymethyl oxazolines are known, and my copending application, Serial No. 482,758, filed April 12, 1943, now U. S. Patent 2,372,409, describes a method for their preparation from esters of nitro hydroxy compounds. However, yields of hydroxymethyl oxazoline esters prepared according to this method are low, and the process, accordingly, is expensive.

I have now found, that esters of hydroxymethyl oxazolines can be prepared in high yields of the order of 60-90% from primary amines, polyhydroxy compounds and monocarboxylic organic acids, according to the scheme illustrated below, in which all the steps are caused to take place in a single operation.

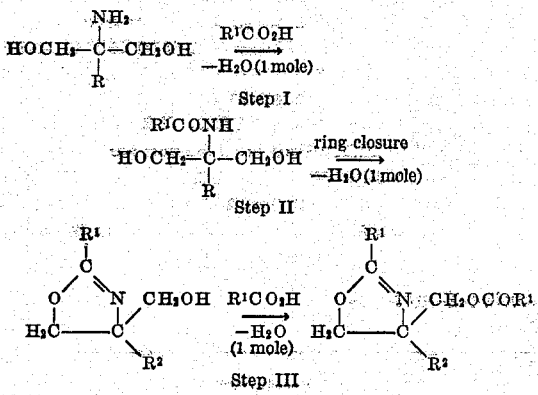

In the above scheme R may be hydrogen, alkyl, or hydroxymethyl, $R^1$ may be alkyl or aryl, $R^2$ may be hydrogen, alkyl, or acyloxymethyl.

If, in the above scheme, steps I and II are carried out independently of step III, that is, if only a single mole of organic acid is used so that the hydroxymethyl oxazoline is first produced, and then the hydroxymethyl group is subsequently esterified in a separate operation, the yields of resulting ester are low, in the neighborhood of only about 20-60%.

I have found, however, that if sufficient acid is added initially both to form the hydroxymethyl oxazoline and to esterify the other hydroxyl group or groups, high yields of the order of 60–90% based on the aminohydroxy compound used are obtained and usually between 80 and 90%.

In carrying out the process of my invention I employ primary amine polyhydroxy compounds, as illustrated above, which I have found to be structurally necessary for conversion to the hydroxymethyl oxazoline esters of my invention. With the primary amine polyhydroxy compound, the appropriate number of moles of an organic acid to form the oxazoline and to esterify the remaining hydroxyl groups is mixed, that is, a mole of acid to form the oxazoline and another mole for each additional hydroxyl group of the amino polyhydroxy compound.

The primary amine polyhydroxy compounds utilizable in my invention include those having the structure given below

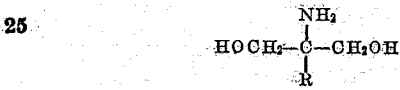

in which R may be hydrogen, alkyl, or hydroxymethyl. Among compounds of this type may be mentioned 2-amino-1,3-propanediol, 2-amino-2-methyl-1,3-propanediol; 2-amino - 2 - ethyl-1,3-propanediol; tris(hydroxymethyl) aminomethane, and the like.

Some of the compounds which can be prepared in accordance with my invention are 2-phenyl-4-methyl-4-benzoöxymethyl-2-oxazoline; 2-heptyl-4-methyl-4-octanoöxymethyl - 2 - oxazoline; 2 - nonyl-4-methyl-4-decanoöxymethyl-2-oxazoline; 2,4 - diethyl-4-propionoxymethyl-2-oxazoline; 2 - nonyl-4-ethyl-4-decanoöxymethyl-2-oxazoline; 2-propyl - 4,4 - bis(butyroxymethyl)-2-oxazoline; 2 - pentyl-4,4-bis(hexanoöxymethyl)-2-oxazoline; 2-heptyl-4,4-bis(octanoöxymethyl)-2-oxazoline; 2-heptadecyl-4,4-bis(stearoxymethyl)-2-oxazoline; 2 - phenyl-4-benzoöxymethyl-2-oxazoline; 2-ethyl-4-propionoxymethyl-2-oxazoline; 2-undecyl-4-lauroxymethyl - 2 - oxazoline, and the like.

In practicing my invention I mix the primary amine polyhydroxy compound with the appropriate monocarboxylic organic acid in the ratio of one mole of primary amine polyhydroxy compound to two or more moles of the organic acid, depending on and corresponding to the number of hydroxyl groups of the amine. Sometimes a slight excess of acid over the indicated equivalent quantities may be employed to bring the reaction more rapidly to completion, but yields are usually excellent with no excess of either component. The mixture is then heated over an increasing temperature range of about 150° C. to 240° C. with means for removing and collecting the water of reaction, until approximately the theoretical amount of water has been removed to indicate substantially complete conversion to the desired product, that is, two molecular equivalents of water will separate in oxazoline formation, and one additional molecular equivalent for each hydroxyl group esterified, the time for the total reaction usually being a period of about 6 to 10 hours. The reaction products may then be purified by distillation if liquids, or crystallization if solids.

In order to further illustrate the process of my invention, the following examples are given.

EXAMPLE I

The compounds listed below in Table I were prepared by the following procedure: 1 mole of 2-amino-2-methyl-1,3-propanediol was mixed with 2 moles of the acid indicated in the table in a reaction vessel equipped with a 3' x 5/8'' all-glass helix packed column fitted with a decanter or separator adapted to separate two liquid layers. Benzene was added to the decanter and allowed to overflow and fill the column and just begin to drop into the reaction vessel. The mixture was heated for a period of about 10 hours over an increasing temperature range of 150 to 240° C., during which time the water of reaction was removed as an azeotrope with the benzene in the column. The water was separated in the decanter and removed, while the benzene was returned to the column. The water of reaction was collected and amounted to about 53 parts (calculated for 3 moles, 54 parts). The crude reaction products were distilled from a Claisen-type flask. The distilled products were light yellow liquids obtained in the yields indicated and having the characteristics listed in the table.

EXAMPLE II

The compounds listed in Table II below were prepared by mixing in each case 1 mole of 2-amino-2-ethyl-1,3-propanediol with 2 moles of the organic acid listed in the table in a reaction vessel equipped with a 3' x 5/8'' all-glass helix packed column fitted with a decanter or separator adapted to separate two liquid layers. Benzene was added to the decanter and allowed to overflow and fill the column and just begin to drop into the reaction vessel. The mixture was heated for a period of about 10 hours over an increasing temperature range of 150 to 240° C., during which time the water of reaction was removed as an azeotrope with the benzene in the column. The water was separated in the decanter and removed, while the benzene was returned to the column. The water of reaction was collected and amounted to about 53 parts (calculated for 3 moles, 54 parts). The crude reaction products were distilled from a Claisen-type flask. The distilled products were light yellow liquids obtained in the yields indicated and having the characteristics listed in the table.

TABLE II

*Compounds prepared from 2-amino-2-ethyl-1,3-propanediol*

| Acid Used | 2,4,4-Substituted-2-oxazolines | | | Per Cent Yield | B. P., °C. (mm.) | $d_{20}^{20}$ | $n_D^{20}$ | Saponification equivalent | | Nitrogen (Kjeldahl), Per Cent | |
|---|---|---|---|---|---|---|---|---|---|---|---|
| | 2 | 4 | 4 | | | | | Calc. | Found | Calc. | Found |
| Propionic [1] | Ethyl | Ethyl | Propionoxymethyl | 72 | 143° (30) | 1.015 | 1.446 | 213 | 192 | 6.57 | 6.61 |
| Capric | Nonyl | do | Decanoöxymethyl | 63 | 200–220° (1–2) | 0.923 | 1.457 | 409 | 405 | 3.42 | 3.59 |

[1] For the nitrogen analysis, a sample of the product was refractionated through an all-glass helix-packed column; the main part of the material boiled at 128° C. at 10 mm.

EXAMPLE III

The compounds listed in Table III were prepared by mixing 1.5 moles of the appropriate organic acid listed in the table and 0.5 mole of tris(hydroxymethyl)aminomethane in a 3'x5/8'' all-glass helix packed column equipped with a decanter or separator adapted to separate two liquid layers. Benzene was added to the decanter and allowed to fill the column and just begin to drop into the reaction vessel. The mixture was heated for a period of 6 to 10 hours over an increasing temperature range of 150 to 240° C. to remove the water as an azeotrope with benzene. The water was separated in the decanter and the benzene returned to the column. The water which was collected amounted to between about 35 and 36 parts; calculated for 2 moles, 36 parts. The crude products were vacuum distilled from a Claisen-type flask, the distilled products were oily

TABLE I

*Compounds prepared from 2-amino-2-methyl-1,3-propanediol*

| Acid Used | 2,4,4-Substituted-2-oxazolines | | | Per Cent Yield | B. P., °C. (mm.) | $d_{20}^{20}$ | $n_D^{20}$ | Saponification equivalent | | Nitrogen (Kjeldahl), Per Cent | |
|---|---|---|---|---|---|---|---|---|---|---|---|
| | 2 | 4 | 4 | | | | | Calc. | Found | Calc. | Found |
| Benzoic | Phenyl | Methyl | Benzoöxymethyl | 83 | 195–215° (2–3) | 1.156 | 1.569 | 295 | 296 | 4.75 | 4.71 |
| Caprylic [1] | Heptyl | do | Octanoöxymethyl | 76 | 170–180° (1–2) | 0.935 | 1.452 | 339 | 334 | 4.13 | 4.20 |
| Capric [1] | Nonyl | do | Decanoöxymethyl | 78 | 200–210° (1–2) | 0.922 | 1.455 | 395 | 387 | 3.54 | 3.54 |

[1] A 5% excess of organic acid was used.

liquids except the one prepared from stearic acid (marked h) which was a light brown wax which was not distilled but was poured into a tray to solidify. In preparing the compound using caprylic acid (marked d), 5% excess of acid was employed. The compounds were obtained in the yields indicated and had the characteristics listed in the table.

of hydrogen, alkyl and acyloxymethyl; the step which comprises heating a mixture of a primary amine polyhydroxy compound of the following formula:

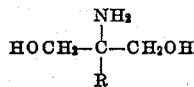

TABLE III
Compounds prepared with tris(hydroxymethyl)-aminomethane

| Acid used | 2, 4, 4-Substituted-2-oxazolines | | | Percent Yield | B. P., °C. (mm.) | $d_{20}^{20}$ | $n_D^{20}$ | Saponification equivalent | | Nitrogen (Kjeldahl), Percent | |
|---|---|---|---|---|---|---|---|---|---|---|---|
| | 2 | 4 | 4 | | | | | Calc. | Found | Calc. | Found |
| Butyric | Propyl | Butyroxymethyl | Butyroxymethyl | 90 | 135–140° (2–3) | 1.047 | 1.453 | 157 | 158 | 4.47 | 4.52 |
| Caproic | Pentyl | Hexanoöxymethyl | Hexanoöxymethyl | 83 | 170° (2) | 0.994 | 1.456 | 199 | 194 | 3.52 | 3.58 |
| Caprylic [1] | Heptyl | Octanoöxymethyl | Octanoöxymethyl | 87 | 250–260° (2) | 0.960 | 1.458 | 241 | 221 | 2.91 | 2.96 |
| Stearic [2] | Heptadecyl | Stearoxymethyl | Stearoxymethyl | 100 | M. P. 76° | | | 448 | 450 | 1.56 | 1.61 |

[1] 5% excess of acid used. [2] Not distilled.

In contrast to the high yields obtained in the preparation of the compounds listed in Tables I, II, and III in which all the steps were carried out in one operation are the compounds listed in Table IV in which the hydroxymethyl oxazoline was first prepared and isolated, and this product treated with additional acid to esterify the hydroxymethyl group.

in which R is selected from the group consisting of hydrogen, alkyl, and hydroxymethyl, with a monocarboxylic acid in the proportion of one mole of monocarboxylic acid for each hydroxyl group in the primary amine polyhydroxy compound until at least 3 mole equivalents of water have separated.

3. A process for preparing esters of 4-hydroxy-

TABLE IV
Compounds prepared in separate steps

| Acid Used | | 2, 4, 4-Substituted-2-oxazolines | | | Per Cent Yield | B. P., °C. (mm.) | $d_{20}^{20}$ | $n_D^{20}$ | Saponification equivalent | | Nitrogen (Kjeldahl), Per Cent | |
|---|---|---|---|---|---|---|---|---|---|---|---|---|
| 1st Step | 2nd Step | 2 | 4 | 4 | | | | | Calc. | Found | Calc. | Found |
| Lauric | Propionic | Undecyl | Methyl | Propionoxymethyl | 36 | 170–190° (2–3) | 0.943 | 1.452 | 325 | 330 | 4.30 | 4.30 |
| Do | Benzoic | do | do | Benzoöxymethyl | 60 | 210–230° (1–2) | 0.994 | 1.495 | 373 | 368 | 3.75 | 3.70 |
| Benzoic | Lauric | Phenyl | do | Lauroxymethyl | 47 | 235° (1–2) | 0.985 | 1.491 | 373 | 361 | 3.75 | 3.70 |

While the above describes the preferred embodiments of my invention, it will be understood that departures may be made therefrom within the scope of the specification and claims.

What is claimed is:

1. A process for preparing esters of 4-(hydroxymethyl)-2-oxazolines which comprises reacting a primary mono amine polyhydroxy compound, containing not in excess of three hydroxyl groups and having the hydroxyl groups on carbons adjacent the carbon carrying the amino group, with a monocarboxylic acid in the proportion of one mole of acid for each hydroxyl group of the primary amine polyhydroxy compound until at least 3 mole equivalents of water have separated.

2. In a process for forming a substituted 4-hydroxymethyl-2-oxazoline and esterifying at least one hydroxymethyl group in a single operation to form compounds having the following structure:

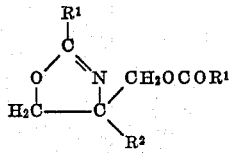

in which the R[1] substituents are identical and are selected from the group consisting of alkyl and aryl, R[2] is selected from the group consisting methyl-2-oxazolines of the following structural formula:

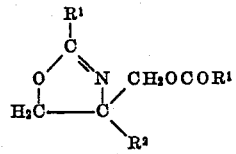

in which the R[1] substituents are identical and are selected from the group consisting of alkyl and aryl, and R[2] is selected from the group consisting of hydrogen, alkyl, and acyloxymethyl, which comprises heating a primary amine polyhydroxy compound of the following formula:

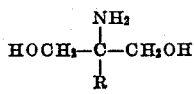

in which R is selected from the group consisting of hydrogen, alkyl, and hydroxymethyl, with a monocarboxylic acid in the proportion of one mole of acid for each hydroxyl group of the primary amine polyhydroxy compound over an increasing temperature range from about 150° C. to about 240° C. until a quantity of water has separated equal to one mole equivalent plus an additional mole equivalent for each hydroxyl group of the primary amine polyhydroxy compound.

4. A process for preparing 2-phenyl-4-methyl-4-benzoöxymethyl-2-oxazoline which comprises heating one mole of 2-amino-2-methyl-1,3-propanediol with at least two moles of benzoic acid over an increasing temperature range of about 150° C. to 240° C. until approximately three moles of water of reaction have separated.

5. A process for preparing 2-nonyl-4-ethyl-4-decanoöxymethyl-2-oxazoline which comprises heating one mole of 2-amino-2-ethyl-1,3-propanediol with at least two moles of capric acid over an increasing temperature range of about 150° C. to 240° C. until approximately three moles of water of reaction have separated.

6. A process for preparing 2-(heptadecyl)-4,4-bis(stearoxymethyl)-2-oxazoline which comprises reacting one mole of tris(hydroxymethyl)-aminomethane with three moles of stearic acid over an increasing temperature range of about 150° C. to 240° C. until approximately four moles of water of reaction have separated.

PHILIP F. TRYON.

REFERENCES CITED

The following references are of record in the file of this patent:

UNITED STATES PATENTS

| Number | Name | Date |
|---|---|---|
| 2,215,038 | Hodgins et al. | Sept. 17, 1940 |
| 2,262,736 | De Groote et al. | Nov. 11, 1941 |
| 2,309,243 | De Groote et al. | Jan. 26, 1943 |
| 2,368,075 | Wampner | Jan. 23, 1945 |
| 2,402,791 | Wampner | June 25, 1946 |

FOREIGN PATENTS

| Number | Country | Date |
|---|---|---|
| 830,125 | France | May 9, 1938 |